United States Patent
Allen et al.

(10) Patent No.: US 10,397,396 B2
(45) Date of Patent: *Aug. 27, 2019

(54) DEVICE FUNCTION DISABLEMENT DURING VEHICLE MOTION

(71) Applicant: INTERNATIONAL BUSINESS MACHINES CORPORATION, Armonk, NY (US)

(72) Inventors: Ira L. Allen, Dallas, TX (US); Douglas D. Williams, Hudson, OH (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/047,064

(22) Filed: Jul. 27, 2018

(65) Prior Publication Data

US 2018/0338034 A1  Nov. 22, 2018

Related U.S. Application Data

(63) Continuation of application No. 15/404,671, filed on Jan. 12, 2017, now Pat. No. 10,063,687, which is a
(Continued)

(51) Int. Cl.
*H04M 1/725* (2006.01)
*G01S 19/13* (2010.01)
(Continued)

(52) U.S. Cl.
CPC .......... *H04M 1/72577* (2013.01); *G01S 5/02* (2013.01); *G01S 19/13* (2013.01); *H04W 8/22* (2013.01);
(Continued)

(58) Field of Classification Search
CPC ....... H04W 24/02; H04W 4/02; H04W 4/027; H04W 4/008; H04W 48/02; H04W 48/04;
(Continued)

(56) References Cited

U.S. PATENT DOCUMENTS 8,401,578 B2   3/2013  Inselberg
8,401,589 B2   3/2013  Liu et al.
(Continued)

OTHER PUBLICATIONS

Amendment filed Jul. 21, 2016 in response to Office Action (dated Apr. 28, 2016) for U.S. Appl. No. 14/988,911, filed Jan. 6, 2016.
(Continued)

*Primary Examiner* — Magdi Elhag
(74) *Attorney, Agent, or Firm* — Schmeiser, Olsen & Watts; Mark C. Vallone (57) ABSTRACT

A method and system for disabling functions of a movement detection enabled device is provided. The method includes monitoring a movement detection signal of the movement detection enabled device in a vehicle and determining that the vehicle is currently in motion. An electronic tag in the vehicle is detected and instructions associated with the movement detection enabled device are retrieved. It is determined that the movement detection enabled device is located within a specified proximity to a driver location of the vehicle and that a user of the device is a driver of the vehicle. In response, specified functions of the movement detection enabled device are disabled.

20 Claims, 7 Drawing Sheets

Related U.S. Application Data continuation of application No. 14/988,911, filed on Jan. 6, 2016, now Pat. No. 9,628,609, which is a continuation of application No. 14/202,572, filed on Mar. 10, 2014, now Pat. No. 9,270,809.

(51) Int. Cl.
| | | |
|---|---|---|
| *H04W 64/00* | (2009.01) | |
| *G01S 5/02* | (2010.01) | |
| *H04W 48/04* | (2009.01) | |
| *H04W 8/22* | (2009.01) | |

(52) U.S. Cl.
CPC ......... *H04W 48/04* (2013.01); *H04W 64/006* (2013.01)

(58) Field of Classification Search
CPC . H04W 64/006; H04M 1/72577; G01S 19/13; G01S 5/02
See application file for complete search history.

(56) References Cited

U.S. PATENT DOCUMENTS

| | | | |
|---|---|---|---|
| 8,417,268 | B1 | 4/2013 | Halferty et al. |
| 8,428,973 | B1 | 4/2013 | Hopkins, III |
| 8,547,214 | B2 | 10/2013 | Basson et al. |
| 8,620,354 | B2 | 12/2013 | Beasley |
| 8,761,821 | B2 | 6/2014 | Tibbitts et al. |
| 8,948,790 | B1 | 2/2015 | Kim et al. |
| 9,270,809 | B2 | 2/2016 | Allen et al. |
| 9,628,609 | B2 | 4/2017 | Allen et al. |
| 9,738,125 | B1* | 8/2017 | Brickley ................. H04W 4/70 |
| 10,063,687 | B2* | 8/2018 | Allen ..................... G01S 19/13 |
| 2007/0072553 | A1 | 3/2007 | Barbera |
| 2009/0085728 | A1 | 4/2009 | Catten et al. |
| 2010/0148920 | A1 | 6/2010 | Philmon et al. |
| 2011/0021234 | A1 | 1/2011 | Tibbitts et al. |
| 2011/0105082 | A1 | 5/2011 | Haley |
| 2012/0040665 | A1 | 2/2012 | Liu et al. |
| 2012/0329444 | A1 | 12/2012 | Osann, Jr. |
| 2013/0210406 | A1 | 8/2013 | Vidal et al. |
| 2013/0303143 | A1 | 11/2013 | Schrader et al. |
| 2014/0011448 | A1 | 1/2014 | Yang |
| 2015/0050966 | A1 | 2/2015 | West |
| 2015/0256996 | A1 | 9/2015 | Allen et al. |
| 2016/0119467 | A1 | 4/2016 | Allen et al. |
| 2017/0126881 | A1 | 5/2017 | Allen et al. |

OTHER PUBLICATIONS

Amendment filed Sep. 2, 2015 in response to Office Action (dated Jun. 3, 2015) for U.S. Appl. No. 14/202,572, filed Mar. 10, 2014.
Notice of Allowance (dated Oct. 23, 2015) for U.S. Appl. No. 14/202,572, filed Mar. 10, 2014.
Notice of Allowance (dated Dec. 8, 2016) for U.S. Appl. No. 14/988,911, filed Jan. 6, 2016.
Office Action (dated Apr. 28, 2016) for U.S. Appl. No. 14/988,911, filed Jan. 6, 2016.
office Action (dated Jun. 3, 2015) for U.S. Appl. No. 14/202,572, filed Mar. 10, 2014.
Office Action (dated Nov. 24, 2017) for U.S. Appl. No. 15/404,671, filed Jan. 12, 2017.
Amendment filed Feb. 23, 2018 in response to Office Action (dated Nov. 24, 2017) for U.S. Appl. No. 15/404,671, filed Jan. 12, 2017.
Notice of Allowance (dated Apr. 24, 2018) for U.S. Appl. No. 15/404,671, filed Jan. 12, 2017.

* cited by examiner

FIG. 7

DEVICE FUNCTION DISABLEMENT DURING VEHICLE MOTION

This application is a continuation application claiming priority to Ser. No. 15/404,671 filed Jan. 12, 2017, now U.S. Pat. No. 10,063,687 issued Aug. 28, 2018, which is a continuation application claiming priority to Ser. No. 14/988,911 filed Jan. 6, 2016 now U.S. Pat. No. 9,628,609 issued Apr. 18, 2017, which is a continuation application claiming priority to Ser. No. 14/202,572 filed Mar. 10, 2014 now U.S. Pat. No. 9,270,809 issued Feb. 23, 2016.

FIELD

The present invention relates generally to a method for determining positions of vehicle occupants with respect to the vehicle and in particular to a method and associated system for using the determined positions to control selected functions of associated devices.

BACKGROUND

Identifying device users typically includes an inaccurate process with little flexibility. Preventing access to a user device based on an identification process may include a complicated process that may be time consuming and require a large amount of resources. Accordingly, there exists a need in the art to overcome at least some of the deficiencies and limitations described herein above.

SUMMARY

A first aspect of the invention provides method comprising: monitoring, by a computer processor of a movement detection enabled device, a movement detection signal of the movement detection enabled device in a vehicle; determining, by the computer processor based on the monitoring the movement detection signal, that the vehicle is currently in motion; detecting, by the computer processor based on the determining that the vehicle is currently in motion, an electronic tag in the vehicle; retrieving, by the computer processor from the electronic tag, instructions associated with the movement detection enabled device; determining, by the computer processor based on the detecting the electronic tag, that the movement detection enabled device is located within a specified proximity to a driver location of the vehicle; determining, by the computer processor based on the determining that the movement detection enabled device is located within the specified proximity to the driver location of the vehicle, that the user is a driver of the vehicle; and disabling, by the computer processor based on the instructions and the determining that the user is the driver of the vehicle, specified functions of the movement detection enabled device.

A second aspect of the invention provides movement detection enabled device comprising a computer processor coupled to a computer-readable memory unit, the memory unit comprising instructions that when executed by the computer processor implements a method comprising: monitoring, by the computer processor, a movement detection signal of the movement detection enabled device in a vehicle; determining, by the computer processor based on the monitoring the movement detection signal, that the vehicle is currently in motion; detecting, by the computer processor based on the determining that the vehicle is currently in motion, an electronic tag in the vehicle; retrieving, by the computer processor from the electronic tag, instructions associated with the movement detection enabled device; determining, by the computer processor based on the detecting the electronic tag, that the movement detection enabled device is located within a specified proximity to a driver location of the vehicle; determining, by the computer processor based on the determining that the movement detection enabled device is located within the specified proximity to the driver location of the vehicle, that the user is a driver of the vehicle; and disabling, by the computer processor based on the instructions and the determining that the user is the driver of the vehicle, specified functions of the movement detection enabled device.

A third aspect of the invention provides a computer program product, comprising a computer readable hardware storage device storing a computer readable program code, the computer readable program code comprising an algorithm that when executed by a computer processor of a movement detection enabled device implements a method, the method comprising: monitoring, by the computer processor, a movement detection signal of the movement detection enabled device in a vehicle; determining, by the computer processor based on the monitoring the movement detection signal, that the vehicle is currently in motion; detecting, by the computer processor based on the determining that the vehicle is currently in motion, an electronic tag in the vehicle; retrieving, by the computer processor from the electronic tag, instructions associated with the movement detection enabled device; determining, by the computer processor based on the detecting the electronic tag, that the movement detection enabled device is located within a specified proximity to a driver location of the vehicle; determining, by the computer processor based on the determining that the movement detection enabled device is located within the specified proximity to the driver location of the vehicle, that the user is a driver of the vehicle; and disabling, by the computer processor based on the instructions and the determining that the user is the driver of the vehicle, specified functions of the movement detection enabled device.

The present invention advantageously provides a simple method and associated system capable of identifying device users.

DETAILED DESCRIPTION

Figure 1:
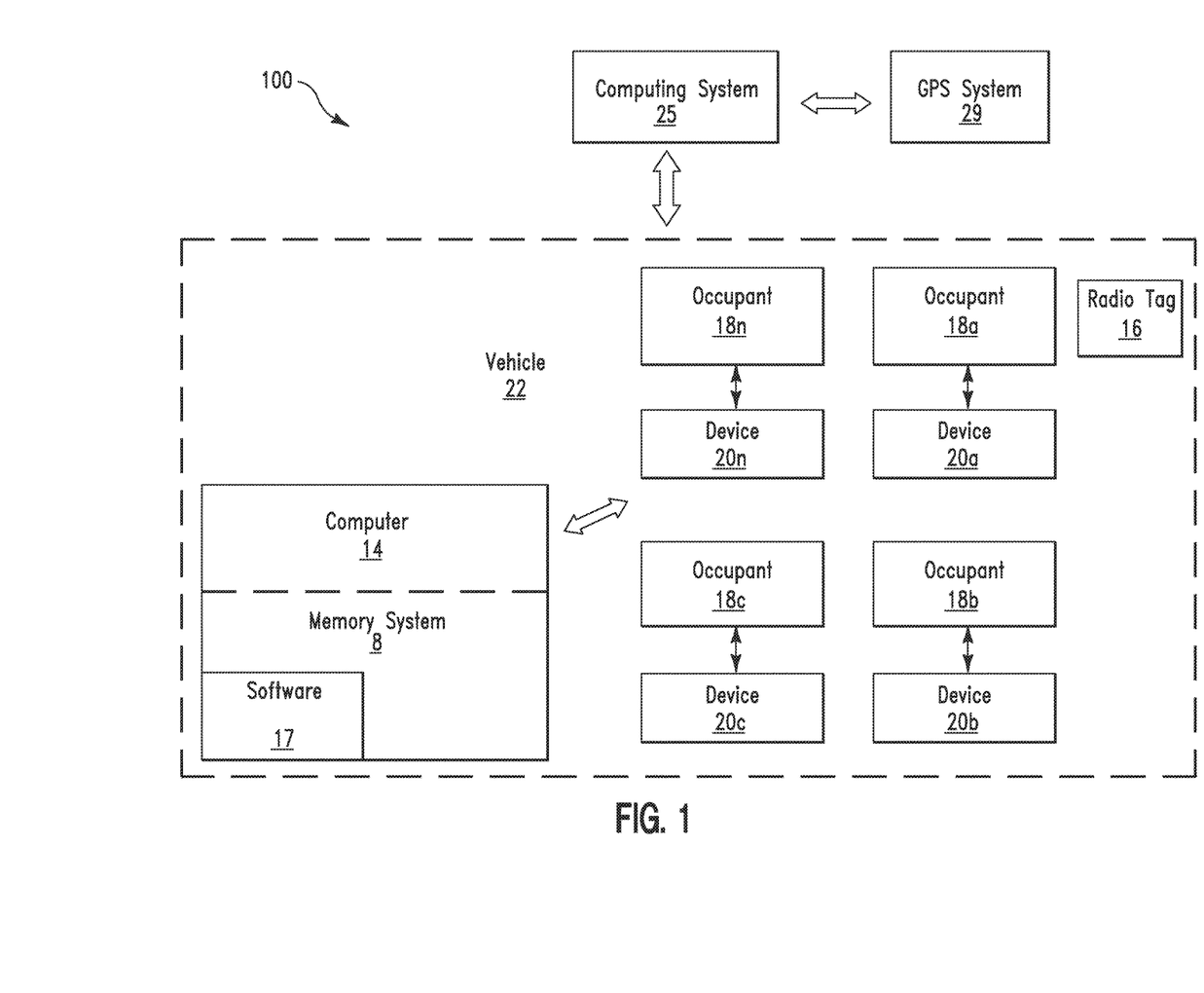
FIG. 1 illustrates a system 100 for determining positions of vehicle occupants with respect to a vehicle and controlling selected functions of associated movement detection enabled devices based on the determined positions, in accordance with embodiments of the present invention.

FIG. 1 illustrates a system 100 for determining positions of vehicle occupants 18a . . . 18n with respect to a vehicle 22 and controlling selected functions of associated movement detection enabled devices 20a . . . 20n based on the determined positions, in accordance with embodiments of the present invention. System 100 is configured to measure a proximity to a radio tag 16 to disable a texting feature of one of devices 20a . . . 20n during motion of vehicle 22. Movement detection enabled devices 20a . . . 20n are enabled to detect a radio tag 16 and/or vehicle motion to activate a disable feature associated with a texting feature, phone call features, Internet features, camera features, etc. (of one of devices 20a . . . 20n). Radio tag 16 may comprise any type of electronic tag including, inter alia, a near field communication (NFC) tag. Radio tag 16 may be placed at any location within vehicle 22. For example, radio tag 16 may be placed (permanently or temporarily) on or within a dashboard, a rearview mirror, a navigation system, a radio, a steering wheel, etc. System 100 is communicatively coupled to a movement detection feature within devices 20a . . . 20n. Therefore if a driver (one of occupants 18a . . . 18n) disables NFC and/or Bluetooth communications (within vehicle 22), software within any of devices 20a . . . 20n (and/or software 17 within an onboard computer 14) may warn an authority entity, record a log indicating the disabling, and/or require a logged manual override to be executed. Additionally, the software disables a texting function on any of devices 20a . . . 20n. Furthermore, the software may log any non-texting activity (performed on any of devices 20a . . . 20n) for; inter alia, insurance purposes, etc. System 100 enables a reward process in combination with a lock out mechanism to create an incentive for a driver while simultaneously mitigating attempts to bypass system 100. The movement detection feature may include any type of device locating methods including, inter alia, global positioning satellite (GPS) tracking/movement detection methods (including triangulation motion detection methods), micro electro-mechanical system (MEMS) methods, Wifi positioning methods, a cellular tower triangulation process, etc.

MEMS (located within cell phones) are enabled to detect acceleration movement (i.e., via an accelerometer and a gyroscope) used to trigger requests for positioning information. Therefore, MEMS enables a process for periodically requesting a current location and comparing the current location to prior location requests thereby determining movement, direction, and speed.

A Wifi positioning method comprises a localization technique (used for positioning with wireless access points) is based on a process for measuring an intensity of a received signal (i.e., received signal strength in English RSS) and a process comprising finger printing. An accuracy of a Wifi positioning method depends on a number of positions entered into a database.

A GPS tracking method (i.e., comprising a triangulation of geo synchronous satellites) comprises a location based service.

A cellular tower triangulation process uses a location area code (LAC) and a Cell ID of an associated cell tower currently connected to an associated cellular telephone to determine a position of the currently connected cellular telephone resulting in data usage from at least three cellular towers. The cellular tower triangulation process calculates a handset's location precisely. Each base station covers a specified geographical area.

System 100 of FIG. 1 includes a computing system 25 and a GPS (or any type of movement detection system) system 29 communicatively connected to vehicle 22. The vehicle 22 includes an onboard computer 14, occupants 18a . . . 18n, a radio tag 16, and associated devices 20a . . . 20n (e.g., driver distraction devices). Onboard computer 14 is communicably connected to devices 20a . . . 20n, computing system 25 and/or GPS system 29. Onboard computer 14 may include any type of computing system(s) including, inter alia, an automobile integrated computer, a computer (PC), a laptop computer, a tablet, etc. Memory system 8 stores program instructions 17 for communicating with computing system 25 and or GPS system 29 (in communications with a GPS), measuring a proximity to radio tag 16, determining vehicle motion, and disabling texting features (and/or voice features) of devices 20a . . . 20n during the detected motion of vehicle 22. Alternatively, devices 20a . . . 20n may directly communicate with computing system 25 and or GPS system 29 to measure the proximity to radio tag 16, determine vehicle motion, and disable texting features (and/or voice features) of devices 20a . . . 20n during the detection of radio tag and/or detected motion of vehicle 22. Devices 20a . . . 20n may comprise global positioning satellite (GPS) devices, mobile computing devices, smart phones, etc.

Figure 2:
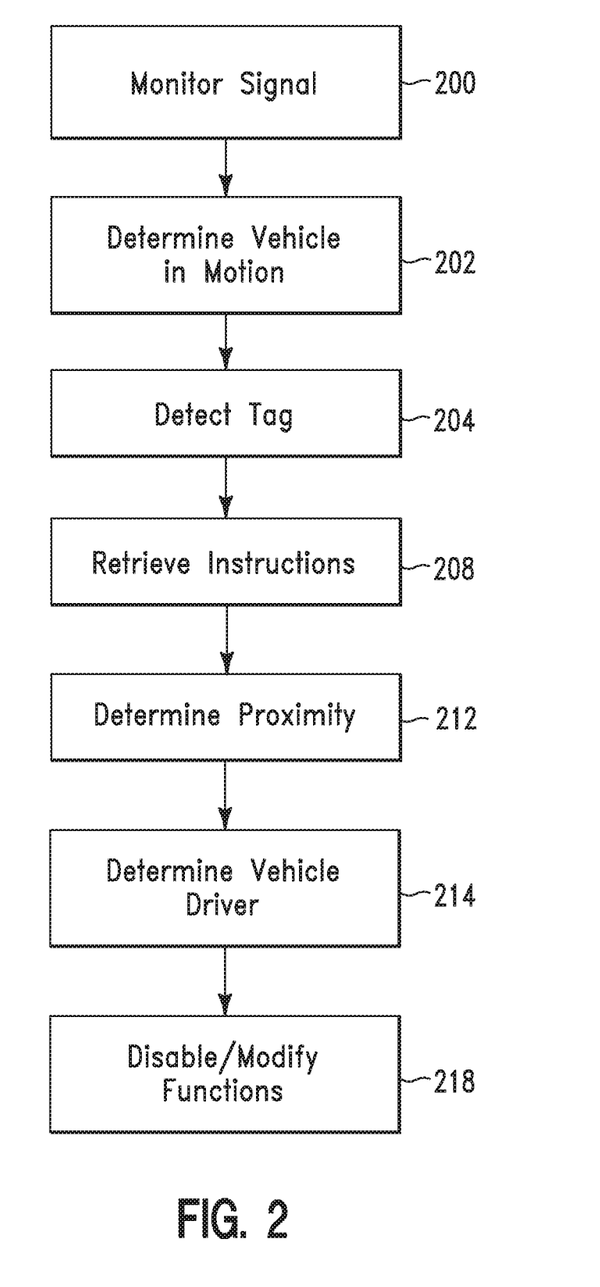
FIG. 2 illustrates an algorithm detailing a process flow enabled by the system of FIG. 1 for determining positions of vehicle occupants with respect to a vehicle and controlling selected functions of associated movement detection enabled devices based on the determined positions, in accordance with embodiments of the present invention.

FIG. 2 illustrates an algorithm detailing a process flow enabled by system 100 of FIG. 1 for controlling selected functions of associated movement detection enabled devices based on determined positions of vehicle occupants, in accordance with embodiments of the present invention. Each of the steps in the algorithm of FIG. 2 may be enabled and executed in any order by a computer processor executing computer code. In step 200, a movement detection signal of a movement detection enabled device in a vehicle is monitored. In step 202, it is determined (based on the monitored movement detection signal of step 200) that the vehicle is currently in motion. In step 204, an electronic tag in the vehicle is detected based on the determined vehicle motion. In step 208, instructions associated with the movement detection enabled device are retrieved from the electronic tag. The instructions may include, inter alia, data defining disabling instructions, override instructions, reporting instructions, etc. In step 212, it is that the movement detection enabled device is located within a specified proximity to a driver location of the vehicle. In step 214, it is determined (based on the proximity of the movement detection enabled device with respect to the radio tag) that determining that a user of the movement detection enabled device is a driver of the vehicle. In step 218, specified functions of the movement detection enabled device are disabled based on the instructions. Disabling the specified functions may include, inter alia:

1. Disabling the movement detection enabled device.
2. Disabling text messaging functions of the movement detection enabled device.
3. Disabling message notification features associated with text messaging functions of the movement detection enabled device.
4. Disabling phone call functions of the movement detection enabled device.
2. Disabling Internet access functions of the movement detection enabled device.

Figure 3:
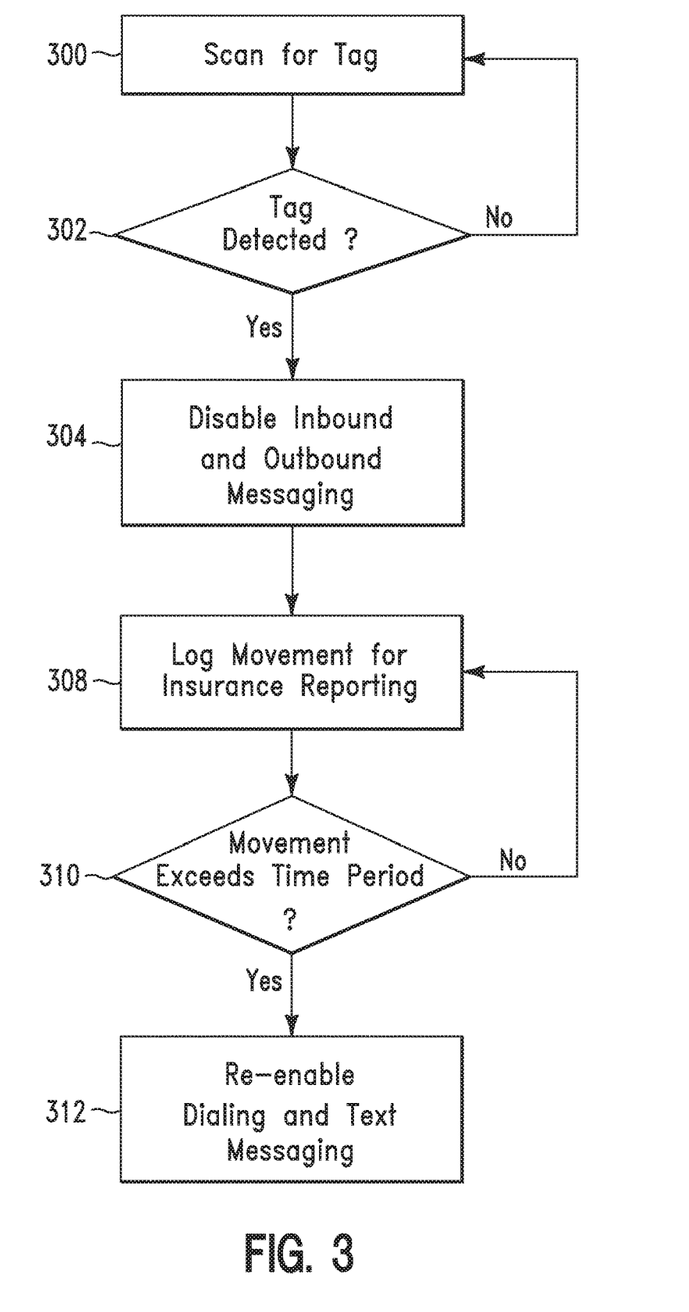
FIG. 3 illustrates an algorithm detailing a process flow enabled by the system of FIG. 1 for logging and controlling selected functions of associated movement detection enabled devices, in accordance with embodiments of the present invention.

FIG. 3 illustrates an algorithm detailing a process flow enabled by system 100 of FIG. 1 for logging and controlling selected functions of associated movement detection enabled devices, in accordance with embodiments of the present invention. In step 300, a system (e.g., system 100 of FIG. 1) scans a vehicle (e.g., vehicle 22 of FIG. 1) for an electronic tag (e.g., radio tag 16 of FIG. 1). In step 302, it is determined if an electronic tag has been detected during the scan of step 300. If in step 302, it is determined that an electronic tag has not been detected then step 300 is repeated. If in step 302, it is determined that an electronic tag has been detected then in step 304 the tag transmits a software code to a movement detection enabled device (e.g., one of devices 20a . . . 20n of FIG. 1) belonging to a user within a specified proximity of the tag (e.g., a driver of the vehicle). The software code disables any texting functions (inbound of outbound), message receipt functions, and dial pad functions associated with executing outbound calls. In step 308, any detected movement of the vehicle is logged for authority entity (e.g., insurance company, police department, etc.) reporting. In step 310, it is determined if the vehicle has been stopped (i.e., not in motion) for at least a specified time period. If in step 310, it is determined that the vehicle has not been stopped (i.e., currently in motion) for at least the specified time period then step 308 is repeated. If in step 310, it is determined that the vehicle has been stopped (i.e., not in motion) for at least the specified time period then in step 312, the disabled specified functions of the movement detection enabled device are enabled.

Figure 4:
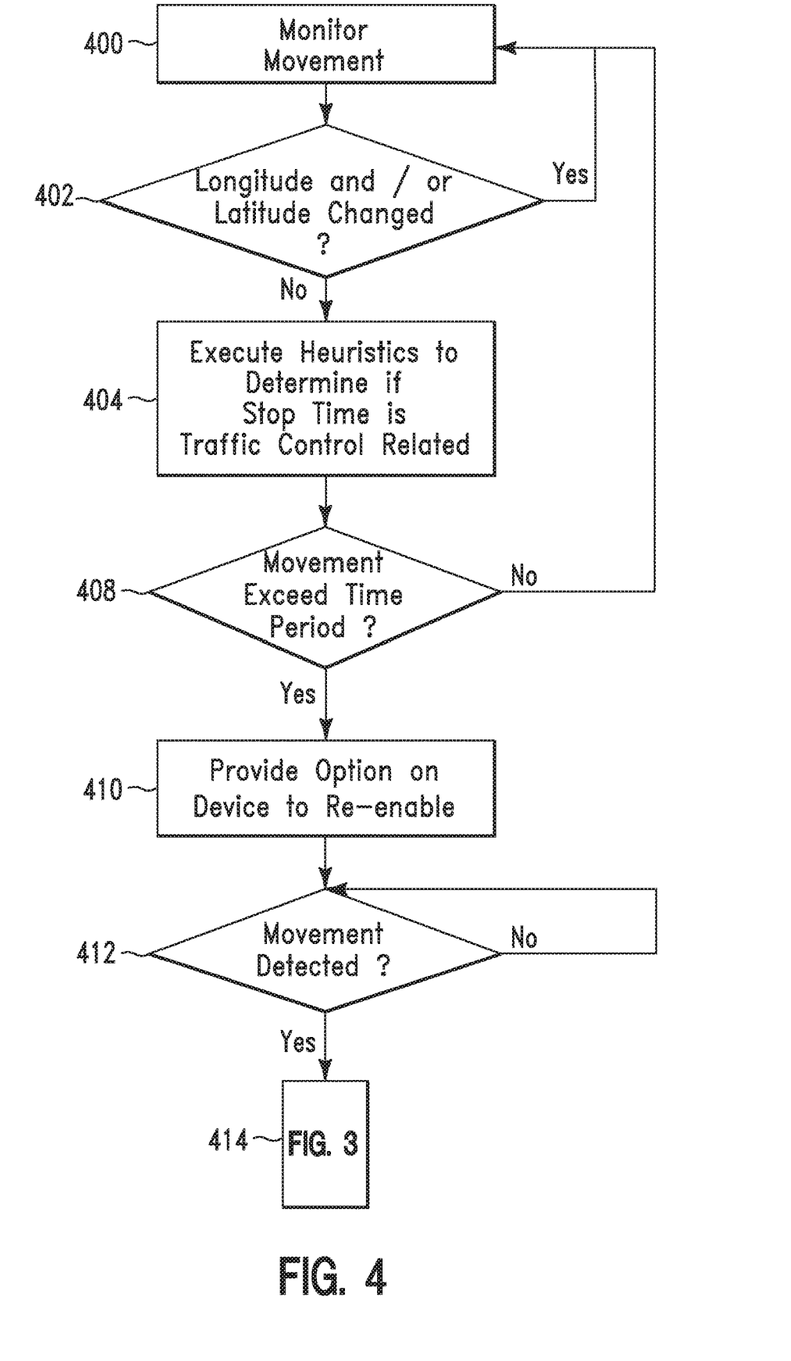
FIG. 4 illustrates an algorithm detailing a process flow enabled by the system of FIG. 1 for performing a statistical analysis with respect to a time period associated with a vehicle not in motion, in accordance with embodiments of the present invention.

FIG. 4 illustrates an algorithm detailing a process flow enabled by system 100 of FIG. 1 for performing a statistical analysis with respect to a time period associated with a vehicle not in motion, in accordance with embodiments of the present invention. In step 400, a system (e.g., system 100 of FIG. 1) monitors movement of a vehicle (e.g., vehicle 22 of FIG. 1). In step 402, it is determined (based on results of step 400) if a latitude or longitude with respect to a location of the vehicle has changed. If in step 402, it is determined that a latitude or longitude with respect to a location of the vehicle has changed then step 400 is repeated to monitor vehicle movement. If in step 402, it is determined that a latitude or longitude with respect to a location of the vehicle has not changed then in step 404 a heuristics algorithm is executed. The heuristics algorithm determines if a stop time (i.e., indicated by the latitude or longitude not changing) period comprises a traffic control related stop time. The heuristics algorithm may reference previous vehicle stop time information associated with the current latitude or longitude. For example, traffic lights operate via: a timer, sensors based upon traffic flow, a schedule, and predetermined priority at specified times of day for north/south directions and east/west directions. Likewise, stop signs are associated with different patterns. For example, a wait period, a short movement process (e.g., of a couple of meters), and a complete halt of motion. Every time a halt in motion is executed, a record is generated. The record comprises an associated: time of day, day of week, longitude/ latitude, and last direction of travel. When motion is initiated, the record is updated with a duration of non-movement. Additionally, when a complete halt of motion occurs, a data base is interrogated for a prior occurrence within a circle area of a specified size (i.e., allowing for arrival at an intersection from a perpendicular direction). Using three sigma analysis process (of the historical data on duration) a probability of either a traffic light or a stop sign is derived. The three sigma analysis is used to calculate probabilities that the associated stop comprises a traffic control related device. A three sigma (or process behavior analysis) statistically analyzes data to determine if the data falls within three standard deviations of the mean in a normal distribution.

In step 408, it is determined if the vehicle has been stopped (i.e., not in motion) for at least a specified time period. If in step 408, it is determined that the vehicle has not been stopped (i.e., currently in motion) for at least the specified time period then step 400 is repeated. If in step 408, it is determined that the vehicle has been stopped (i.e., not in motion) for at least the specified time period then in step 410, an option (indicating an enable feature for an associated GPS enabled device) is presented to the user (e.g., a driver). In step 412, it is determined if any vehicle movement has been detected. If in step 412, it is determined that any vehicle movement has not been detected then step 412 is repeated until movement has been detected. If in step 412, it is determined that vehicle movement has been detected then in step 414 the algorithm of FIG. 3 is executed.

Figure 5:
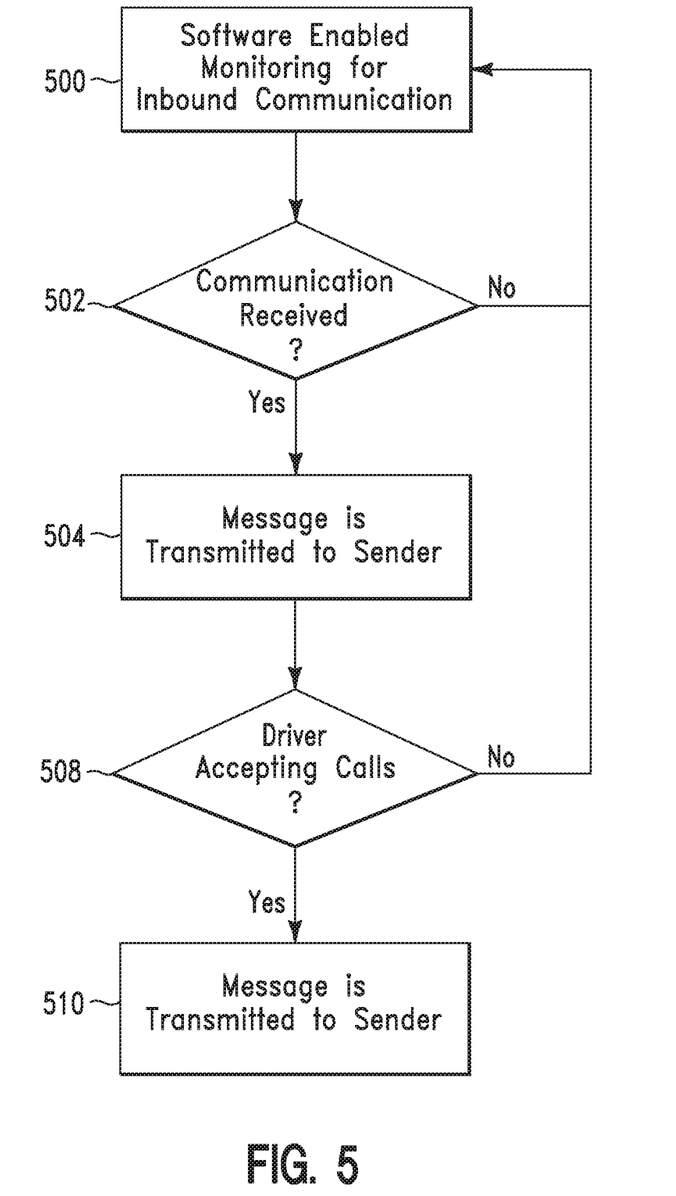
FIG. 5 illustrates an algorithm detailing a process flow enabled by the system of FIG. 1 for receiving a communication without notifying a driver of a vehicle, in accordance with embodiments of the present invention.

FIG. 5 illustrates an algorithm detailing a process flow enabled by system 100 of FIG. 1 for receiving a communication without notifying a driver of a vehicle, in accordance with embodiments of the present invention. The algorithm of FIG. 5 allows a driver of a vehicle to select automatic acceptance and logging of any inbound communication. Additionally, if an inbound communication exceeds a predetermined time period threshold, then inbound communication data is captured and reported. A communication duration may be limited to just enough time to communicate such that that the driver will call the individual back or the driver may pull over to take the call.

In step 500, software (e.g., software of a movement detection enabled device, software of a radio tag, software 17 of FIG. 1, etc.) is enabled for monitoring a movement detection enabled device for an inbound communication (e.g., a text message, a phone call, an email, etc.). In step 502, it is determined if an inbound communication has been received by the movement detection enabled device. If in step 502, it is determined that an inbound communication has not been received by the movement detection enabled device then step 500 is repeated. If in step 502, it is determined that an inbound communication has been received by the movement detection enabled device then in step 504, a message is automatically transmitted to a sender of the inbound communication. The message may indicate that a driver of the vehicle (i.e., associated with the movement detection enabled device) is currently driving and will respond to the inbound communication at a later time. In step 508, it is determined if the driver is currently accepting communications. If in step 508, it is determined that the driver is not currently accepting communications then step 500 is repeated. If in step 508, it is determined that the driver is currently accepting communications then in step 500 a message is automatically transmitted to a sender of the inbound communication. The message may indicate that the driver is currently accepting brief communications.

Figure 6:
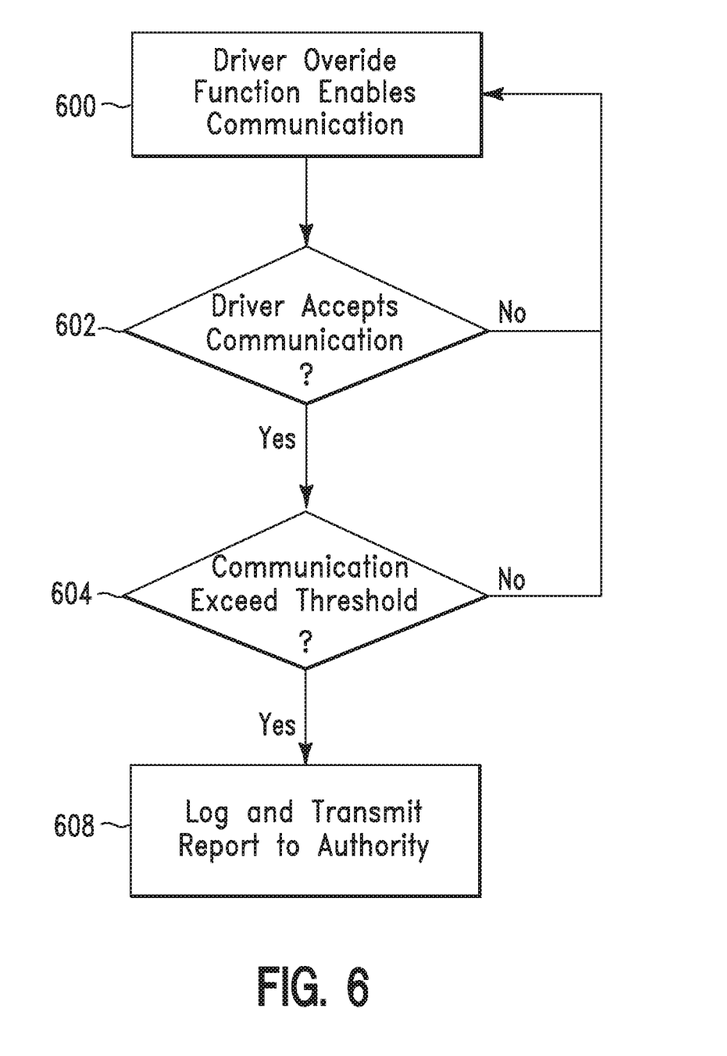
FIG. 6 illustrates an algorithm detailing a process flow enabled by the system of FIG. 1 for logging a communications, in accordance with embodiments of the present invention.

FIG. 6 illustrates an algorithm detailing a process flow enabled by system 100 of FIG. 1 for logging a communications, in accordance with embodiments of the present invention. The algorithm of FIG. 6 allows movement detection enabled device (of a driver of a vehicle) receive an inbound communication without being alerted. The movement detection enabled device may be configured to automatically transmit a message to a sender of the inbound communication. The message may indicate that the received communication will be delivered to the driver at a later time.

In step 600, a driver of a vehicle enables an override function of a movement detection enabled device. The override function enables acceptance of inbound communication (e.g., a text message, a phone call, an email, etc.). In step 602, it is determined if the driver will accept an inbound communication has been received by the movement detection enabled device. If in step 602, it is determined that the driver will not accept an inbound communication then step 600 is repeated. If in step 602, it is determined that the driver will accept an inbound communication then in step 604, the communication is received by the driver and it is determined if the communication exceeds a specified threshold. If in step 604 it is determined that the communication does not exceed a specified threshold then step 600 is repeated. If in step 604 it is determined that the communication does exceed a specified threshold then in step 608 the communication is logged and a report is transmitted to an authority entity.

Figure 7:
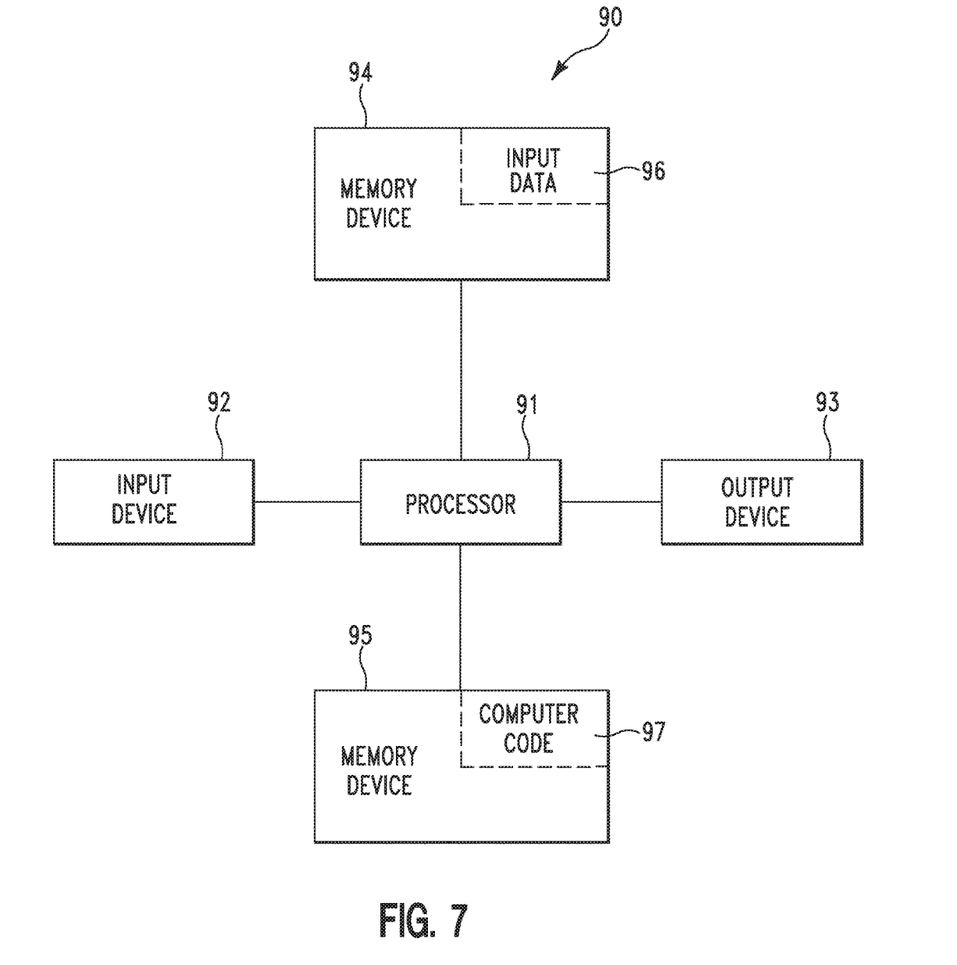
FIG. 7 illustrates a computer apparatus used by the system of FIG. 1 for determining positions of vehicle occupants with respect to a vehicle and controlling selected functions of associated movement detection enabled devices based on the determined positions, in accordance with embodiments of the present invention.

FIG. 7 illustrates a computer system 90 used by system 100 of FIG. 1 for determining positions of vehicle occupants with respect to a vehicle and controlling selected functions of associated movement detection enabled devices based on the determined positions, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-6) for determining positions of vehicle occupants with respect to a vehicle and controlling selected functions of associated movement detection enabled devices based on the determined positions. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may include the algorithms of FIGS. 2-6 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to determine positions of vehicle occupants with respect to a vehicle and control selected functions of associated movement detection enabled devices based on the determined positions. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for determining positions of vehicle occupants with respect to a vehicle and controlling selected functions of associated movement detection enabled devices based on the determined positions. In another embodiment, the invention provides a business method that performs the process steps of the invention on a subscription, advertising, and/or fee basis. That is, a service supplier, such as a Solution Integrator, could offer to determine positions of vehicle occupants with respect to a vehicle and control selected functions of associated movement detection enabled devices based on the determined positions. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A method comprising:
enabling, by a computer processor of a movement detection enabled device located within a vehicle, a warning function of an on-board computer of said vehicle communicating with said movement detection enabled device, wherein said warning function is for indicating that an individual has disabled communications of said vehicle and subsequently generating a log and warning for an authority entity indicating that said communications have been disabled by said individual;
determining, by said computer processor based on monitoring a movement detection signal of said movement detection enabled device, that said vehicle is currently in motion;
retrieving, by said computer processor from an electronic tag in said vehicle, instructions associated with said movement detection enabled device, wherein said instructions define commands associated with: disabling said movement detection enabled device, overriding said disabling said movement detection enabled device, and instructions for reporting said disabling said movement detection enabled device to an authority entity;
determining, by said computer processor based on detecting said electronic tag and results of measuring a proximity of said movement detection enabled device with respect to said electronic tag, that said movement detection enabled device is located within a specified proximity of said electronic tag indicating a driver location of said vehicle;
determining, by said computer processor based on determining that said movement detection enabled device is located within said specified proximity to said driver location of said vehicle, that said user is a driver of said vehicle; and
disabling, by said computer processor based on said instructions and said determining that said user is said driver of said vehicle, specified functions of said movement detection enabled device.

2. The method of claim 1, wherein said disabling said specified functions comprises disabling said movement detection enabled device.

3. The method of claim 1, wherein said disabling said specified functions comprises disabling text messaging functions of said movement detection enabled device.

4. The method of claim 1, wherein said disabling said specified functions comprises disabling message notification features associated with text messaging functions of said movement detection enabled device.

5. The method of claim 1, wherein said disabling said specified functions comprises disabling phone call functions of said movement detection enabled device.

6. The method of claim 1, wherein said disabling said specified functions comprises disabling Internet access functions of said movement detection enabled device.

7. The method of claim 1, wherein said electronic tag comprises a near field communication (NFC) tag.

8. The method of claim 1, wherein said movement detection enabled device comprises a device selected from the group consisting of a smart phone, a tablet computer, a PDA, and a cellular telephone.

9. The method of claim 1, further comprising:
logging, by said computer processor, movement data indicating that said vehicle is currently in motion;
transmitting, by said computer processor, said movement data to an authority entity;
determining, by said computer processor, that said vehicle is currently not in motion for a specified time period; and
enabling, by said computer processor in response to said determining that said vehicle is currently not in motion for said specified time period, said specified functions of said movement detection enabled device.

10. The method of claim 1, further comprising:
determining, by said computer processor, that a current latitude and longitude with respect to a current location of the vehicle has not changed;
determining, by said computer processor based on said determining that said current latitude and longitude with respect to said current location of the vehicle has not changed, that said vehicle is not currently in motion for a time period;
executing, by said computer processor, a heuristics algorithm with respect to said time period;
determining, by said computer processor based on results of said executing, that said time period is associated with a traffic control related stop time period;
determining, by said computer processor, if said time period exceeds a predetermined time period; and
presenting, by said computer processor via a display of said movement detection enabled device and based on results of said determining if said time period exceeds said predetermined time period, an option for enabling said specified functions of said movement detection enabled device.

11. The method of claim 1, further comprising:
receiving, by said computer processor from said user, a command for overriding said disabling;
enabling, by said computer processor in response to said receiving said command, said specified functions of said movement detection enabled device;
determining, by said computer processor, that said enabling has exceeded a specified time period;
logging, by said computer processor, override data indicating that said enabling has exceeded said specified time period; and
transmitting, by said computer processor, said override data to an insurance reporting agency or an authority entity.

12. The method of claim 1, further comprising:
monitoring, by said computer processor, said movement detection enabled device;
determining, by said computer processor based on results of said monitoring, that inbound communication data is currently being received by said movement detection enabled device
generating, by said computer processor, a message indicating that said user is currently driving said vehicle and will review said inbound communication data at a later time period; and
transmitting, by said computer processor, said message to a device transmitting said inbound communication data.

13. The method of claim 1, wherein said instructions comprise data defining disabling instructions, override instructions, and reporting instructions.

14. The method of claim 1, further comprising:
providing at least one support service for at least one of creating, integrating, hosting, maintaining, and deploying computer-readable code in the computing system, said code being executed by the computer processor to implement said determining that said vehicle is currently in motion, said detecting, said retrieving, said determining that said movement detection enabled device is located within said specified proximity, said determining that said user is said driver of said vehicle, and said disabling.

15. A movement detection enabled device comprising a computer processor coupled to a computer-readable memory unit, said memory unit comprising instructions that when executed by the computer processor implements a method comprising:
enabling, by said computer processor of said movement detection enabled device located within a vehicle, a warning function of an on-board computer of said vehicle communicating with said movement detection enabled device, wherein said warning function is for indicating that an individual has disabled communications of said vehicle and subsequently generating a log and warning for an authority entity indicating that said communications have been disabled by said individual;

determining, by said computer processor based on monitoring a movement detection signal of said movement detection enabled device, that said vehicle is currently in motion;

retrieving, by said computer processor from an electronic tag in said vehicle, instructions associated with said movement detection enabled device, wherein said instructions define commands associated with: disabling said movement detection enabled device, overriding said disabling said movement detection enabled device, and instructions for reporting said disabling said movement detection enabled device to an authority entity;

determining, by said computer processor based on detecting said electronic tag and results of measuring a proximity of said movement detection enabled device with respect to said electronic tag, that said movement detection enabled device is located within a specified proximity of said electronic tag indicating a driver location of said vehicle;

determining, by said computer processor based on determining that said movement detection enabled device is located within said specified proximity to said driver location of said vehicle, that said user is a driver of said vehicle; and disabling, by said computer processor based on said instructions and said determining that said user is said driver of said vehicle, specified functions of said movement detection enabled device.

16. The computing system of claim 15, wherein said disabling said specified functions comprises disabling said movement detection enabled device.

17. The computing system of claim 15, wherein said disabling said specified functions comprises disabling text messaging functions of said movement detection enabled device.

18. The computing system of claim 15, wherein said disabling said specified functions comprises disabling message notification features associated with text messaging functions of said movement detection enabled device.

19. The computing system of claim 15, wherein said disabling said specified functions comprises disabling phone call functions of said movement detection enabled device.

20. A computer program product, comprising a computer readable hardware storage device storing a computer readable program code, said computer readable program code comprising an algorithm that when executed by a computer processor of a movement detection enabled device implements a method, said method comprising:

enabling, by said computer processor of said movement detection enabled device located within a vehicle, a warning function of an on-board computer of said vehicle communicating with said movement detection enabled device, wherein said warning function is for indicating that an individual has disabled communications of said vehicle and subsequently generating a log and warning for an authority entity indicating that said communications have been disabled by said individual;

determining, by said computer processor based on monitoring a movement detection signal of said movement detection enabled device, that said vehicle is currently in motion;

retrieving, by said computer processor from an electronic tag in said vehicle, instructions associated with said movement detection enabled device, wherein said instructions define commands associated with: disabling said movement detection enabled device, overriding said disabling said movement detection enabled device, and instructions for reporting said disabling said movement detection enabled device to an authority entity;

determining, by said computer processor based on detecting said electronic tag and results of measuring a proximity of said movement detection enabled device with respect to said electronic tag, that said movement detection enabled device is located within a specified proximity of said electronic tag indicating a driver location of said vehicle;

determining, by said computer processor based on determining that said movement detection enabled device is located within said specified proximity to said driver location of said vehicle, that said user is a driver of said vehicle; and disabling, by said computer processor based on said instructions and said determining that said user is said driver of said vehicle, specified functions of said movement detection enabled device.

* * * * *